US012673480B2

(12) United States Patent
Asikainen et al.

(10) Patent No.: US 12,673,480 B2
(45) Date of Patent: Jul. 7, 2026

(54) CO-EXTRUDED MULTI-LAYERED CELLULOSE-BASED FILM AND A METHOD FOR ITS MANUFACTURE AND PRODUCTS MANUFACTURED THEREFROM

(71) Applicant: Woodly Oy, Helsinki (FI)

(72) Inventors: Martta Asikainen, Helsinki (FI); Upi Anttila, Helsinki (FI)

(73) Assignee: Woodly Oy, Helsinki (FI)

( * ) Notice: Subject to any disclaimer, the term of this patent is extended or adjusted under 35 U.S.C. 154(b) by 332 days.

(21) Appl. No.: 18/247,594

(22) PCT Filed: Oct. 4, 2021

(86) PCT No.: PCT/FI2021/050653
§ 371 (c)(1),
(2) Date: Mar. 31, 2023

(87) PCT Pub. No.: WO2022/069805
PCT Pub. Date: Apr. 7, 2022

(65) Prior Publication Data
US 2024/0017528 A1 Jan. 18, 2024

(30) Foreign Application Priority Data

Oct. 2, 2020 (FI) ..................................... 20205967

(51) Int. Cl.
| | |
|---|---|
| *B32B 23/04* | (2006.01) |
| *B29C 48/00* | (2019.01) |
| *B32B 23/18* | (2006.01) |
| *B32B 23/20* | (2006.01) |
| *B29C 48/21* | (2019.01) |
| *B29K 1/00* | (2006.01) |
| *B29K 105/00* | (2006.01) |
| *B29K 105/26* | (2006.01) |

(52) U.S. Cl.
CPC ............ *B32B 23/04* (2013.01); *B29C 48/022* (2019.02); *B32B 23/18* (2013.01); *B32B 23/20* (2013.01); *B29C 48/0017* (2019.02); *B29C 48/21* (2019.02); *B29K 2001/08* (2013.01); *B29K 2105/0005* (2013.01); *B29K 2105/26* (2013.01); *B32B 2250/40* (2013.01); *B32B 2255/26* (2013.01); *B32B 2307/306* (2013.01); *B32B 2307/31* (2013.01); *B32B 2307/406* (2013.01); *B32B 2307/408* (2013.01); *B32B 2307/412* (2013.01); *B32B 2307/54* (2013.01); *B32B 2307/581* (2013.01); *B32B 2307/7246* (2013.01); *B32B 2307/746* (2013.01); *B32B 2439/46* (2013.01)

(58) Field of Classification Search
None
See application file for complete search history.

(56) References Cited

U.S. PATENT DOCUMENTS

| | | | | | |
|---|---|---|---|---|---|
| 5,391,423 | A | * | 2/1995 | Wnuk | A61F 13/15252 |
| | | | | | 428/424.8 |
| 6,974,612 | B1 | * | 12/2005 | Frisk | B65D 5/708 |
| | | | | | 428/34.3 |
| 2007/0032577 | A1 | | 2/2007 | Kanzawa et al. | |
| 2007/0287007 | A1 | * | 12/2007 | Williams | B65D 65/40 |
| | | | | | 428/355 EN |
| 2008/0032076 | A1 | | 2/2008 | Dujardin et al. | |
| 2008/0113118 | A1 | | 5/2008 | Hashimoto et al. | |
| 2010/0003457 | A1 | | 1/2010 | Ettridge et al. | |
| 2010/0022764 | A1 | | 1/2010 | Otoshi et al. | |
| 2012/0045604 | A1 | | 2/2012 | Gavel et al. | |
| 2019/0185617 | A1 | * | 6/2019 | Briois | C08G 63/183 |

FOREIGN PATENT DOCUMENTS

| | | | |
|---|---|---|---|
| CN | 1085493 | A | 4/1994 |
| CN | 103717396 | A | 4/2014 |
| CN | 104943306 | A | 9/2015 |
| CN | 107561620 | A | 1/2018 |
| CN | 109955555 | A | 7/2019 |
| CN | 110291120 | A | 9/2019 |
| CN | 111655474 | A | 9/2020 |
| EP | 3034291 | A1 | 6/2016 |
| EP | 3106316 | A2 | 12/2016 |
| JP | 2000502413 | A | 2/2000 |
| JP | 2000098546 | A | 4/2000 |
| JP | 2000264343 | A | 9/2000 |
| JP | 2004053870 | A | 2/2004 |
| JP | 2006290929 | A | 10/2006 |
| JP | 2007137461 | A | 6/2007 |

(Continued)

OTHER PUBLICATIONS

Finnish Patent and Registration Office, Search Report Issued in Application No. 20205967, Apr. 15, 2021, 3 pages.
ISA European Patent Office, International Search Report Issued in Application No. PCT/FI2021/050653, Dec. 8, 2021, WIPO, 5 pages.
ISA European Patent Office, Written Opinion of the International Searching Authority Issued in Application No. PCT/FI2021/050653, Dec. 8, 2021, WIPO, 6 pages.
Finnish Patent and Registration Office, Office Action Issued in Application No. 20205967, Jan. 19, 2022, 8 pages.
China National Intellectual Property Administration, Office Action and Search Report Issued in Application No. 202180064407.9, Jul. 8, 2025, 32 pages. (Submitted with English Translation).
Japanese Patent Office, Office Action Issued in Application No. 2023-517249, Aug. 5, 2025, 16 pages. (Submitted with Machine Translation).

*Primary Examiner* — Chinessa T. Golden

(74) *Attorney, Agent, or Firm* — McCoy Russell LLP

(57) ABSTRACT

Disclosed is a co-extruded multi-layered cellulose-based film, which comprises at least a first film layer A comprising at least one first cellulose-based polymer and at least one second polymer. The film further comprises at least one sealing layer B being an outer layer and/or a middle layer of said film, and at least one slip additive. Further, the film is produced by a film extrusion process. Disclosed are also packaging materials comprising the film and a method related thereto.

18 Claims, No Drawings

(56) References Cited

FOREIGN PATENT DOCUMENTS

| | | | |
|------|-------------|----|---------|
| JP   | 2018021103  | A  | 2/2018  |
| JP   | 2018024781  | A  | 2/2018  |
| JP   | 2018145279  | A  | 9/2018  |
| JP   | 2020523461  | A  | 8/2020  |
| KR   | 20120078472 | A  | 7/2012  |
| WO   | 2007046174  | A1 | 4/2007  |
| WO   | 2014136772  | A1 | 9/2014  |
| WO   | 2017156364  | A2 | 9/2017  |
| WO   | 2019207204  | A1 | 10/2019 |
| WO   | 2020115363  | A1 | 6/2020  |

* cited by examiner

CO-EXTRUDED MULTI-LAYERED CELLULOSE-BASED FILM AND A METHOD FOR ITS MANUFACTURE AND PRODUCTS MANUFACTURED THEREFROM

CROSS REFERENCE TO RELATED APPLICATIONS

The present application is a U.S. National Phase of International Application No. PCT/FI2021/050653 entitled "CO-EXTRUDED MULTI-LAYERED CELLULOSE-BASED FILM AND A METHOD FOR ITS MANUFAC-TURE AND PRODUCTS MANUFACTURED THERE-FROM," and filed on Oct. 4, 2021. International Application No. PCT/FI2021/050653 claims priority to Finnish Patent Application No. 20205967 filed on Oct. 2, 2020. The entire contents of each of the above-listed applications are hereby incorporated by reference for all purposes.

TECHNICAL FIELD

The present disclosure relates to a co-extruded multi-layered cellulose-based film, wherein the film comprises at least a first film layer A, and at least one sealing layer B. Disclosed are also packaging material comprising the co-extruded multi-layered cellulose-based film and a manufac-turing method related thereto.

BACKGROUND

There are various methods for producing cellulose-based films. Films can be made from cellulose esters and aliphatic or aromatic polyesters or copolyesters. However, materials with a high cellulose content are lacking in properties. For these materials to be produced in industrial scale and usable for various packaging applications, several requirements must be met. The existing solutions are unable to meet these requirements.

Thus, the inventors have discovered a need to develop higher quality materials to meet the demand for more applications. Especially there is a need to develop higher quality multi-layered cellulose-based films.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject-matter.

Described is a co-extruded multi-layered cellulose-based film. The film comprises a first film layer A comprising at least one first cellulose-based polymer and at least one second polymer. The film further comprises at least one sealing layer B being an outer layer and/or a middle layer of said film. In addition, the film comprises at least one slip additive. The co-extruded multi-layered film may be pro-duced by a film extrusion process.

Further, described is a method for manufacturing a co-extruded multi-layered cellulose-based film.

Described are also packaging materials comprising a co-extruded multi-layered cellulose-based film.

DETAILED DESCRIPTION

The present disclosure concerns a co-extruded multi-layered cellulose-based film, wherein said film comprises a first film layer A comprising at least one first cellulose-based polymer and at least one second polymer, at least one sealing layer B being an outer layer and/or a middle layer of said film, at least one slip additive, and wherein said film is produced by a film extrusion process.

Further disclosed is a packaging material comprising the described co-extruded multi-layered cellulose-based film.

Disclosed is also a method for manufacturing a co-extruded multi-layered cellulose-based film, wherein the method comprises the steps of;

i. providing a first polymer composition for forming a first film layer A, comprising at least one first cellulose-based polymer and at least one second polymer, ii. providing a sealing polymer composition for forming at least one sealing film layer B, and iii. forming a co-extruded multi-layered film comprising said first film layer A and said sealing film layer B through a film extrusion process, wherein said film comprises at least a one slip additive.

The method for manufacturing a co-extruded multi-lay-ered cellulose-based film may be used for producing any of the co-extruded multi-layered cellulose-based films described herein.

According to one embodiment, the co-extruded multi-layered cellulose-based film has a cellulose content of at least 20 wt. %. The cellulose content may typically be in the range of 20 to 60 wt. %, or 30 to 60 wt. %, or 35 to 55 wt. %, or 40 to 45 wt. % based on the total weight of the film. The cellulose content may also be at least 25 wt. %, or at least 30 wt. %, or at least 35 wt. %, or at least 40 wt. %. The wt. % is based on the total weight of the film. Preferably, the cellulose content is in the range of 30 to 50 wt. %, or 35 to 45 wt. %.

By the expression "cellulose content" should be under-stood in this specification, unless otherwise stated, the cellulose content that is calculated based on the cellulose polymer present in the composition. For example, the cel-lulose polymer derivative used in the composition can be in the form of a cellulose ester, and in this case the amount (wt. %) of cellulose is calculated as without the ester groups covalently bound to the cellulose polymer. Thus, the cellu-lose content does not equal the weight of the cellulose derivative content. Since the cellulose-based polymer derivative usually is in the form of an ester, or other otherwise substituted, the cellulose content of the film is typically not above 55 wt. %.

By the expression "cellulose-based film" etc. should be understood in this specification, unless otherwise stated, a film where a considerable part of the raw material is based on cellulose polymer or cellulose polymer derivative. The cellulose content of the cellulose-based film may typically be at least 20 wt. %. The cellulose polymer can be chemi-cally modified to obtain, for instance, thermoplastic prop-erties.

By the expression "co-extruded multi-layered" or "co-extruded multi-layered film" should be understood in this specification, unless otherwise stated, a material or film manufactured through co-extrusion. Co-extrusion is a manu-facturing process, which involves pressing two or more materials together through the same die to produce a single piece. When multiple films or materials are combined through co-extrusion, the result can yield properties distinct from those of a single film or material. A co-extruded multi-layered film is typically produced by a technique that simultaneously extrudes thermoplastic resin with multiple extruders and passes them through a single die to build up layers of melted resin both on the inside and outside of a film.

This disclosure describes co-extruded multi-layered cellulose-based films. The films are suitable for various packaging solutions.

In many packaging solutions, it is of high importance that a packaging film can be sealed. To obtain this, good sealing properties are required. There are many sealing techniques, of which the most common is heat-sealing. The novel co-extruded multi-layered cellulose-based films described herein have excellent sealing properties, especially heat-sealing properties, provided by the defined co-extruded multi-layered structure.

By the expression "sealabilty" or "sealing" should be understood in this specification, unless otherwise the ability to attach two or more separate films to each other by introducing heat.

Films produced with extrusion processes can have layered structures. The structures are typically produced in the extrusion process by having several feeding screws, or extruders. As the film line can have for example one, three, five or seven extruders, the resulting film can also contain as many layers.

The layered structure technique of the film extrusion process can be used for producing multi-layered films, which provides several advantages since the separate layers may have different properties. However, the technique has previously not been utilized for cellulose-based raw materials in the way described herein. Cellulose-based films, as described herein, have not been produced with industrial film extrusion processes for manufacturing co-extruded multi-layered films.

In this disclosure several film structures are described. The structure can be A-B, where A and B represent film layers that are different from each other. The film structure can also be for example A-B-A, where the middle film layer B differs from the outer film layers A. The film structure can also be A-B-C or for instance A-B-C-B-A, where three different layers are being used in various configurations. This can be further elaborated to A-B-C-D-C-B-A etc.

As stated, in many applications it is important that a film meant for packaging applications can be sealed. Otherwise, the film cannot be used at all in many packaging applications. Typically, when adding heat-sealing properties to traditional cellulose-based films, polyvinylidene dichloride (PVDC) is being used as a coating. PVCD provides heat-sealing properties, but it is a chlorinated polymer. Thus, the use of PVCD for coating makes the entire packaging unfit for recycling of even incineration. The co-extruded multi-layered cellulose-based films described herein do not require the use of a PVDC coating.

Further, the inventors recognized that it is of high importance that a film intended for a packaging application can be produced efficiently. The commonly used techniques for film production are different extrusion processes, such as blown film extrusion and cast film extrusion processes. There are cellulose-based film products on the market, which are produced with solvent casting methods or through viscose processes. These traditional cellulose-based films are typically acetate and cellophane type products and are not thermally processable due to their poor or non-existing thermal resistance. Thus, solvent casting methods or viscose processes require proprietary machinery and technology and are therefore very expensive and hard to scale up.

The novel films described herein provide a scalable production method, wherein the granulate used for the film production is processable with high outputs and processing efficiency. The composition for the films has high thermal resistance. These are advantages, because a high processing efficiency is typically difficult to provide for new materials and new biobased plastics.

A packaging film should preferably be clear, transparent, and glossy so that the product packed inside the packaging looks appealing. A packaging film should also preferably have sufficient rigidity and puncture resistance to protect the packed product. The described co-extruded multi-layered films provides these properties to the packaging material manufactured thereof. The novel films may be clear, transparent and glossy as well as rigid and with high puncture resistance.

Traditionally, the aim in the production of multi-layered films is to obtain a film with optimal properties for the intended application. Properties such as grease, oxygen or vapor barriers, mechanical resistance, UV protection, sealing, chemical resistance and so on, can be introduced to the final film structure by the multi-layered film technique.

As multi-layering is practical for obtaining good properties for various film applications, it is detrimental for recycling. Multi-layered films are known to be a challenge for the plastic recycling processes. Typically, multi-layered films can be recycled merely as energy via incineration, or possibly as feedstock for some chemical recycling processes where the resulting yields are low. Mechanical plastics recycling is not practical as the layers cannot be separated from each other during the recycling process.

The co-extruded multi-layered cellulose-based films described herein provide a sustainable alternative to multi-layered films, where cellulose-based raw-material is manufactured into a film structure with an industrial scale extrusion process. A heat-sealing layer is introduced into the extrusion process as a film layer B in a layer structure comprising a film layer structure of e.g. A-B, A-A-B, A-B-C or A-B-A. The co-extruded multi-layered structures of this disclosure, including the sealing layer, can be recycled with mechanical plastics recycling. The sealing agents used may be easily recycled together with the film and the resulting recycled material has very high-quality properties.

Apart from good processability and heat-sealing properties, the films are clear and transparent, as well as glossy. Thus, they are very well suited for packaging material films.

In this invention, film structures comprising layers, such as A-B, A-A-B, A-B-C and A-B-A are being introduced. Naturally, the films can also be produced with many other layered structures depending on the configuration of the film extrusion line.

i. According to one embodiment, the process temperature of the film extrusion process is in the range of 200 to 240° C. The temperature may also be in the range of 210 to 230° C. Other suitable ranges are for example 205 to 235° C., or 215 to 225° C. The most suitable temperature range depends on the composition and number of layers.

ii. According to one embodiment, at least one outer layer of the co-extruded multi-layered film comprises at least one slip additive in an amount of 0.5 to 5 wt. %. The slip additive amount may typically be 1 to 3 wt. %, or for example 1.5 to 4.5 wt. %, or 2 to 4 wt. %. The amount is based on the total weight of said layer. These amounts of slip additive have shown to provide the necessary processability to produce smooth and clear films, easy reeling into a film roll, without damaging the heat-sealing properties to the films of this disclosure.

iii. Typically, slip additives (or slip agents) are divided in two classes, migrating and nonmigrating slip additives. Slip additives may be inorganic compounds, such as silica or talc. Slip additives may also be organic compounds, such as fatty acid amides (for example erucamide and oleamide), fatty acid esters, metallic stearates, or waxes. Often combinations of several slip additives are used. Slip additives are often in the form of masterbatches. Often the formulations contain both slip additives and antiblock additives.

iv. According to one embodiment, the slip additive is selected from the group consisting of migrating slip additives, nonmigrating slip additives, inorganic slip additives, organic slip additives and masterbatch slip additives, or any combination or mixture thereof. The masterbatch type slip additive usually includes a carrier material, such as a polymer, and an active material.

v. According to one embodiment, the co-extruded multi-layered cellulose-based film is produced by a film extrusion process with an output of 200-500 kg/h. The slip additive in the amounts mentioned above have shown to provide the ability to give outputs in this range. Output refers to the processing speeds. Cellulose-based films with high cellulose content (such as cellophanes and acetates) often require proprietary technology for their production. However, by far the most common production method for a flexible or a rigid packaging is film extrusion, such as blown film extrusion and cast film extrusion processes. It is an advantage that the cellulose-based film products can be manufactured with these film extrusion methods, which is possible for the co-extruded multi-layered cellulose-based films of this disclosure.

vi. According to one embodiment, the film extrusion process is blown film extrusion process or cast film extrusion process.

vii. By the expression "recycling" or "recycled" should be understood in this specification, unless otherwise stated, the process, or obtained by the process, of reprocessing and reusing a material so that the molecules in the material are obtained back in reuse either as polymers, monomers or smaller chemical building blocks. Recyclability refers to the ability to recycle a material for re-use. Preferably, plastic packaging films and materials should be recyclable with either mechanical recycling or chemical recycling to enable re-use of the molecular material. This is clearly stated in the European Commission reports (Plastics Strategy 2018) as well as in the basic principles of Circular Economy. Films with high cellulose content are not known to be recyclable for re-use. Films with high cellulose content are composed of cellulose acetates or regenerated celluloses and these types of films do not undergo mechanical recycling due to the lacking on thermal properties. Also, when PVDC is being used as a sealing layer the recyclability is lost. Even when the plastic film material can be reprocessed into a new pellet, it is not evident that the resulting pellets are fit for the production for a new film. However, the co-extruded multi-layered cellulose-based films of this disclosure may be recyclable both chemically and mechanically.

"Mechanical recycling" is for example the process of taking a plastic film roll and feeding it into a shredder, melting it, compounding it into a strand, and then pelletizing the strand. These recycled pellets can then be made into a new film product.

"Chemical recycling" is for example the process of taking a plastic film roll and processing the material into small chemical components, for instance syngas, the mixture of hydrogen, $H_2$, and carbon monoxide, CO. These chemical building blocks can then be used directly in the making of new monomers for the new plastic product.

Different parts of the polymers can be recycled in different way. Cellulose derivatives can undergo chemical recycling. Further, many types of organic polymers can be used as feedstocks for chemical recycling. Traditional cellulose-based polymers and films, such as cellophanes, cellulose acetates and other esters, are usable feedstocks for chemical recycling. Typically, the outcome of the chemical recycling process is for example syngas, a combination of hydrogen $H_2$ and carbon monoxide CO gases.

Re-producing the cellulose polymer structure itself as the outcome of chemical recycling is however currently not done. However, the chemicals used in the modification of the cellulose can be produced from chemically recycled feedstocks. For instance, the acetate groups in cellulose acetate, or the propionic ester groups in cellulose acetate propionate can be produced from the chemically recycled feedstocks.

Furthermore, several polymers, such as polyesters, can be used as feedstocks for chemical recycling. The outcomes of their recycling process can vary depending on the process that is being used. Polyesters can be either hydrolyzed to the oligomers, dimers, or monomers. Also, the polymer can be rebuilt by using an esterification process. Polyesters can also be used in thermal chemical recycling processes to produce for instance syngas. This mixture can then be further used to build monomers, or other chemical building blocks. Therefore, polymers like polyesters can be used as feedstock in chemical recycling processes. In addition, polymers like polyesters can be manufactured from the materials which are the outcome of chemical recycling processes.

According to one embodiment, the co-extruded multi-layered cellulose-based film comprises chemically recycled content.

According to one embodiment, the co-extruded multi-layered cellulose-based film contains 5 to 80 wt. %, or 20 to 70 wt. %, or 30 to 60 wt. %, or 40 to 50 wt. %, chemically recycled content based on the total weight of the film. The amount may be for example 10 to 80 wt. %, or 30 to 50 wt. % chemically recycled content based on the total weight of the film. The amount of chemically recycled content may also be for example 40 to 80 wt. %, or 50 to 70 wt. %, or 60 to 75 wt. %. Preferably, the amount of chemically recycled content is 5 to 40 wt. %.

Currently, a cellulose polymer derivative cannot be entirely made with chemically recycled content. Typically, the ester moieties in the cellulose acetate, cellulose acetate propionate or cellulose acetate butyrate can be made from chemically recycled content. In practice, the maximum chemically recycled content in the cellulose derivative therefore is defined by the wt. % of the ester moieties to the total weight of the cellulose polymer derivative. This may typically vary from 20 wt. % to 55 wt. % depending on the ester moiety and the degree of substitution. This is the range for the maximum chemically recycled content in the cellulose polymer derivative as wt. % of the total weight of the cellulose polymer derivative.

For other polymers, such as aliphatic polyesters, the polyester part can be entirely made with chemically recycled feedstocks. Therefore, the maximum chemically recycled content for e.g. polyester is 100 wt. %.

When the films according to this description are produced, the chemically recycled content may typically vary from 50 wt. % to up to 80 wt. % if all ester groups in the cellulose-based polymer, such as a cellulose polymer derivative, and the second polymer, such as a polyester, are made from chemically recycled materials.

According to one very specific embodiment, the chemically recycled content in the co-extruded multi-layered cellulose-based film is introduced within the cellulose-based polymer. Preferably, the polymer is cellulose acetate propionate. The propionate obtained via chemical recycling is more environmentally friendly than the alternative known methods.

According to one embodiment, the co-extruded multi-layered cellulose-based film comprises mechanically recycled cellulose-based blend.

According to one embodiment, the co-extruded multi-layered cellulose-based film contains 5 to 100 wt. % mechanically recycled content based on the total weight of the film. The amount of the mechanically recycled content may also be for example 10 to 95 wt. %, or 15 to 90 wt. %, or 20 to 85 wt. %, or 25 to 80 wt. %, or 30 to 75 wt. %. The mechanically recycled films have shown to show a good enough puncture resistance, which make them suitable for packaging applications.

According to one embodiment, the co-extruded multi-layered cellulose-based film contains both mechanically and chemically recycled content.

According to one embodiment, the sealing layer B is at least one middle layer of the film.

According to one embodiment, the sealing layer B is at least one outer layer of the film.

According to one embodiment, the co-extruded multi-layered cellulose-based film comprises at least one sealing layer B, which is at least one of a middle layer and/or an outer layer of said co-extruded multi-layered film, and the said sealing layer B is introduced during the film extrusion process. This provides an efficient process for manufacturing cellulose-based films, which can be then produced in industrial scale.

According to one embodiment, the co-extruded multi-layered cellulose-based film comprises a film layer structure selected from the group consisting of A-B, A-B-A, A-B-C, A-C-B and A-A-B. The expression "film layer structure" refers to the order of which layers are placed and extruded to each other.

According to one embodiment, the sealing layer B comprises at least one polymer with heat-sealing property. The polymer with a heat-sealing sealing property may be called a heat-sealing polymer in this description. Thus, the sealing layer may provide the required sealing properties to the co-extruded multi-layered cellulose-based film of this disclosure. A suitable heat-sealing polymer is a polymer or blend with a relatively low melting point. According to one embodiment, the sealing layer B comprises at least one polymer with a heat-sealing property, wherein the melting point of the polymer with a heat-sealing property is between 50° C. and 210° C., or between 60° C. and 200° C., or between 70° C. and 190° C., or between 80° C. and 180° C.

According to one embodiment, a suitable heat-sealing polymer is a polymer or a polymer blend with a suitable melt flow rate (MFR). According to a specific embodiment, the sealing layer B comprises at least one polymer with a heat-sealing property, wherein the MFR of the polymer with a heat-sealing property is between 1 g/10 min and 20 g/10 min (190° C.; 2.16 kg) measured with ISO1133 method. The MFR of the polymer with a heat-sealing property may also be between 2 g/10 min and 15 g/10 min (190° C.; 2.16 kg), or between 3 g/10 min and 10 g/10 min (190° C.; 2.16 kg), or between 4 g/10 min and 6 g/10 min (190° C.; 2.16 kg).

For example, the polymer with heat-sealing property may be polybutylene succinate (PBS), polybutylene adipate terephthalate (PBAT) and/or polylactic acid (PLA). Preferably, the polymer with heat-sealing property is PBS. The polymer with heat-sealing property may also be a hotmelt adhesive.

According to one embodiment, the sealing layer B comprise at least one polymer co-extruded in the sealing layer B. The co-extruded polymer preferably is an aliphatic and/or aliphatic-aromatic polyester or is made by ring-opening of a lactone. Using an aliphatic and/or aliphatic-aromatic polyester in the sealing layer B has shown to give good sealing properties.

According to one embodiment, the polymer co-extruded in the sealing layer is an aliphatic polyester.

According to one embodiment, the polymer co-extruded in the sealing layer is selected from the group consisting of polybutylene succinate (PBS), polypropylene succinate (PPS), polybutylene succinate adipate (PBSA), polybutylene adipate terephthalate (PBAT), polylactic acid (PLA), polycaprolactone (PCL), polybutylene adipate (PBA), polyhydroxyalkanoate (PHA), polyhydroxybutyrate (PHB), polyethylene furanoate (PEF), polybutylene terephthalate (PBT), polybutylene succinate terephthalate (PBST), and any polyester containing sebacic and/or azelaic acid and/or dodecanedioic acid as dicarboxylic acid alone or in combination with terephthalic acid, and any combination of these. According to a very specific embodiment, the polymer co-extruded in the sealing layer is selected from the group consisting of polybutylene succinate (PBS), polybutylene adipate terephthalate (PBAT) and polylactic acid (PLA) or any combination of these.

According to one preferred embodiment, the polymer co-extruded in the sealing layer is polybutylene succinate.

According to one embodiment, the polymer co-extruded in the sealing layer B constitutes 5 to 40 wt. %, or 10 to 30 wt. %, of the total weight of the sealing layer B.

According to one embodiment, the co-extruded multi-layered cellulose-based film is heat-sealable, and the film is coated with a sealing coating, such as a dispersion coating or adhesive coating.

According to one embodiment, the co-extruded multi-layered cellulose-based film is coated with a coating selected from at least one of a barrier coating, a sol-gel coating, or a heat resistant coating.

According to one embodiment, the co-extruded multi-layered cellulose-based film is treated with plasma or corona treatment prior to the coating is applied.

According to one embodiment, the first layer A comprises a first cellulose-based polymer selected from cellulose esters with an ester side chain length between C2 and C16. The side chains may be branched or unbranched. The side chains may include mixtures of several ester groups. Preferably, the side length of the branched or unbranced ester side chain is between C3 and C10, or between C3 and C8, or between C3 and C5, or between C2 and C4. The degree of substitution of the cellulose-based polymer may be between 0.5 and 3. Preferably, the degree of substitution is between 1 and 3. Most preferably the degree of substitution is between 2 and 3. The cellulose ester may be a mixed cellulose ester with more than one type of ester side chain. Alternatively or in addition, several different cellulose esters may be mixed in the polymer composition.

According to one embodiment, the first layer A comprises a first cellulose-based polymer being cellulose acetate propionate (CAP) and/or cellulose acetate butyrate (CAB), and a second polymer selected from the group consisting of polybutylene succinate (PBS), polypropylene succinate (PPS), polybutylene succinate adipate (PBSA), polybutylene adipate terephthalate (PBAT), polylactic acid (PLA), polycaprolactone (PCL), polybutylene adipate (PBA), polyhydroxyalkanoate (PHA), polyhydroxybutyrate (PHB), polyethylene furanoate (PEF), polybutylene terephthalate (PBT), polybutylene succinate terephthalate (PBST), and any polyester containing sebacic and/or azelaic acid and/or dodecanedioic acid as dicarboxylic acid alone or in combination with terephthalic acid, and any combination of these), and the total amount of said first and said second polymer is at least 80 wt. % based on the total weight of said first layer A. According to one very specific embodiment, the first cellulose-based polymer is cellulose acetate propionate (CAP) and/or cellulose acetate butyrate (CAB). Preferably, the cellulose-based polymer is cellulose acetate propionate. According to one very specific embodiment, the second polymer is polybutylene succinate (PBS), polypropylene succinate (PPS) and/or polybutylene succinate adipate (PBSA).

According to one embodiment, the sealing layer B comprises a first cellulose-based polymer selected from cellulose esters with an ester side chain length between C2 and C16. The side chains may be branched or unbranched. The side chains may include mixtures of several ester groups. Preferably, the side length of the branched or unbranced ester side chain is between C3 and C10, or between C3 and C8, or between C3 and C5, or between C2 and C4. The degree of substitution of the cellulose-based polymer may be between 0.5 and 3. Preferably, the degree of substitution is between 1 and 3. Most preferably the degree of substitution is between 2 and 3. The cellulose ester may be a mixed cellulose ester with more than one type of ester side chain. Alternatively or in addition, several different cellulose esters may be mixed in the polymer composition.

According to one embodiment, the sealing layer B comprises a first cellulose-based polymer being cellulose acetate propionate (CAP) and/or cellulose acetate butyrate (CAB), and a second polymer selected from the group consisting of polybutylene succinate (PBS), polypropylene succinate (PPS), polybutylene succinate adipate (PBSA), polybutylene adipate terephthalate (PBAT), polylactic acid (PLA), polycaprolactone (PCL), polybutylene adipate (PBA), polyhydroxyalkanoate (PHA), polyhydroxybutyrate (PHB), polyethylene furanoate (PEF), polybutylene terephthalate (PBT), polybutylene succinate terephthalate (PBST), and any polyester containing sebacic and/or azelaic acid and/or dodecanedioic acid as dicarboxylic acid alone or in combination with terephthalic acid, and any combination of these), and the total amount of said first and said second polymer is at least 80 wt. % based on the total weight of said sealing layer B. Preferably, the sealing layer comprises cellulose acetate propionate and polybutylene succinate.

According to one very specific embodiment, the sealing layer B consists of only the polymer with heat-sealing property. According to one very specific embodiment, the sealing layer B consists of polybutylene succinate (PBS).

According to one embodiment, the first layer A comprises at least one first cellulose-based polymer in an amount of 55 to 95 wt. %, and at least one second polymer in an amount of 5 to 45 wt. % based on the total weight of said first layer A. The amount of the first cellulose-based polymer may also be 60 to 90 wt. %, or 65 to 85 wt. %, or 70 to 80 wt. %. The amount of the second polymer may also be 10 to 40 wt. %, or 15 to 35 wt. %, or 20 to 30 wt. %.

According to one embodiment, in the first layer A the total amount of said first cellulose-based polymer and said second polymer is at least 80 wt. %, or at least 90 wt. %, or at least 95 wt. %, based on the total weight of the first layer A, the rest being other polymers and/or additives such as slip additives, softeners, pigments, stabilizers or other additives for use in plastic compositions.

According to one embodiment, the co-extruded multi-layered cellulose-based film can be oriented. The film can be oriented in machine direction, or in transverse direction. The films can also be oriented in both directions for bi-axial orientation to impart thermal shrinkage, or to improve tensile strength, or to improve impact strength of the product.

Described are also packaging materials comprising a co-extruded multi-layered cellulose-based film.

According to one embodiment, the packaging material comprises co-extruded multi-layered cellulose-based film. According to one embodiment, the packaging material is selected from the group consisting of a bag, a conical bag, a bag with perforations, a bag with a tearing element, a pouch, a sachet, a flowpack packaging, a packaging with thin seals, a packaging with wide seals, a sealable packaging, a resealable packaging, a bag with wide side seals, a bag with laminated side seals, any kind of flexible packaging, semi-rigid or rigid packagings, thermoformed products, such as a tray or a tray and top-layer, a clamshell packaging, a blister packaging, a cardboard-plastic combination packaging, a protective packaging, a barrier packaging, a laminating film, an agricultural film, such as greenhouse film, crop forcing film, silage film, or silage stretch film, a protective film, a cushioning film, such as bubble wrap or bubble packing, a shrink film, and a shrink sleeve.

The films may be used for packaging materials for semi-rigid or rigid packagings, in thermoforming applications, such as tray, tray and top-layer, clamshell packaging, blister packaging, packaging made with a combination of cardboard and plastic, protective packaging, barrier packaging etc.

The films may be used for the packaging of for example fresh food, perishable food, dry food, cosmetics, electronics, hygiene products, cleaning products, tools, toys, medical products other household goods, consumer goods and industrial products.

The films may also be used as laminating film, such as laminating on paper, paperboard cardboard, aluminum, composite, or plastic.

Further, the films may be used for agricultural film, such as greenhouse film, crop forcing film, silage film, silage stretch film etc.

A further possible use is as protective films, cushioning films, such as bubble wrap, bubble packing etc.

According to one embodiment, the packaging material is selected from the group consisting of a bag, pouch or a sachet with thin seals. In addition, the film comprises the film layer structure A-B-A.

According to one very specific embodiment, the packaging material is a resealable bag. Resealable bags typically include a rectangular bag sealed from three sides, and a closing mechanism for the side that is open. The closing mechanism may be a zip or zipper, a top zip, a press to close zipper, or a closure that can be opened and closed several times either by pressing the seal or by pulling a zipper pull to close the seal. The closing mechanism is typically sealed in the plastic bag so that it closes the bag tightly.

The closing mechanism or zipper can be made with an extruder or a zipper profile extruder. It can be made as a long strand or as a single piece. The zipper is made with a thermoplastic material.

According to one embodiment the zipper material comprises a first cellulose-based polymer selected from cellulose esters with an ester side chain length between C2 and C16. The side chains may be branched or unbranched. The side chains may include mixtures of several ester groups. Preferably, the side length of the branched or unbranced ester side chain is between C3 and C10, or between C3 and C8, or between C3 and C5, or between C2 and C4. The degree of substitution of the cellulose-based polymer may be between 0.5 and 3. Preferably, the degree of substitution is between 1 and 3. Most preferably the degree of substitution is between 2 and 3. The cellulose ester may be a mixed cellulose ester with more than one type of ester side chain. Alternatively or in addition, several different cellulose esters may be mixed in the polymer composition.

According to one embodiment the zipper material comprises a first cellulose-based polymer being cellulose acetate propionate (CAP) and/or cellulose acetate butyrate (CAB), and a second polymer selected from the group consisting of polybutylene succinate (PBS), polypropylene succinate (PPS), polybutylene succinate adipate (PBSA), polybutylene adipate terephthalate (PBAT), polylactic acid (PLA), polycaprolactone (PCL), polybutylene adipate (PBA), polyhydroxyalkanoate (PHA), polyhydroxybutyrate (PHB), polyethylene furanoate (PEF), polybutylene terephthalate (PBT), polybutylene succinate terephthalate (PBST), and any polyester containing sebacic and/or azelaic acid and/or dodecanedioic acid as dicarboxylic acid alone or in combination with terephthalic acid, and any combination of these), and the total amount of said first and said second polymer is at least 80 wt. % based on the total weight of said sealing layer B. Preferably, the sealing layer comprises cellulose acetate propionate and polybutylene succinate.

The recyclability of the described resealable bag with the closing mechanism may be preserved, as the zipper is recyclable with the bag.

EXAMPLES

Reference will now be made in detail to various embodiments, examples of the described co-extruded multi-layered films of this disclosure.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

MATERIALS USED IN THE EXAMPLES

CAB is Cellulose acetate butyrate grades CAB-381-20 (Eastman), Product Number 419044 (Sigma Aldrich)

TOFA methyl ester is Tall oil fatty acid methyl ester (various suppliers)

CAP is Cellulose acetate propionate from Eastman, grades CAP-482-20, Treva Engineering Bioplastic GC6011 clear, Treva Engineering Bioplastic TR6012FPNAT Natural GS Pla is GS Pla AZ91T polymer from Mitsubishi TEC is triethyl citrate (various suppliers)

FZ91 is BioPBS FZ91PM from PTT MCC Biochem

FD92PM is BioPBS FD92PM from PTT MCC Biochem

S723 is SUKANO PBS ao S723

S724 is SUKANO PBS dc S724

IM100 is Croda IncroMax 100 as 5% masterbatch in FZ91 polymer

S547 is SUKANO PLA uv S547

IncroMold S is IncroMold™ S polymer additive from Croda

Incroslip SL is Incroslip™ SL polymer additive from Croda

Incromax PS is IncroMax PS from Croda as 5% masterbatch in FZ91 polymer

S511 is SUKANO PLA dc S511

4060D is PLA resin Ingeo Biopolymer 4060D Heat-seal Layer

Biomelt 2K is Kiilto Biomelt 2K from Kiilto Oy

Carbobond 1995 is Carbobond 1995 Acrylic co-polymer from Lubrizol

Carbobond 3005 is Carbobond 3005 Acrylic co-polymer from Lubrizol

Hycar 26084 is Hycar 26084 Carboxy-Modified, Reactive Acrylic Latex from Lubrizol Hycar 26288 is Hycar 26288 Acrylic co-polymer from Lubrizol Hycar 26349 is Hycar 26349 Acrylic co-polymer from Lubrizol Hycar 26548 is Hycar 26548 Acrylic co-polymer from Lubrizol ACTEseal HSC-426-WK is a heat seal lacquer for polyester film from Actega ACTEseal HM-194-AFP is a heat seal coating from Actega

Example 1-Reference Examples

Cellulose-Based Blends and Film Compositions

TABLE 1

| | | | | | | | Film | |
|---|---|---|---|---|---|---|---|---|
| Blend | Cellulose-based polymer | Second polymer | Third polymer | Additive 1 | Additive 2 | Compounding temperature | extrusion temperature | Film property |
| 1 | CAB 70% | | | TOFA methyl ester 30% | | 140-170° C. | 140-170° C. | Clear and elastic |
| 2 | CAB 60% | | | TOFA methyl ester 40% | | 170° C. | 170° C. | Clear and elastic |
| 3 | CAP 55.8% | GS Pla 37.2% | | TOFA methyl ester 4.7% | TEC 2.3% | 210° C. | 210-215° C. | Clear and elastic |
| 4 | CAP 55.6% | GS Pla 37.0% | | TOFA methyl ester 5.5% | TEC 1.9% | 210° C. | 210-215° C. | Clear and elastic |

TABLE 1-continued

| | | | | Additive | Additive | Compounding | Film extrusion | Film |
|---|---|---|---|---|---|---|---|---|
| Blend | Cellulose-based polymer | Second polymer | Third polymer | 1 | 2 | temperature | temperature | property |
| 5 | CAP 60% | FZ91 40% | | | | 210° C. | 210-215° C. | Clear and elastic |
| 6 | CAP 70% | FZ91 30% | | | | 210° C. | 210-215° C. | Clear and rigid |
| 7 | CAP 72.5% | FZ91 27.5% | | | | 210° C. | 210-215° C. | Clear and rigid |
| 8 | CAP 80% | FZ91 20% | | | | 210° C. | 220-230° C. | Clear and rigid |
| 9 | CAP 85% | FZ91 15% | | | | 210° C. | 220-230° C. | Clear and rigid |
| 10 | CAP 90% | FZ91 10% | | | | 210° C. | 220-230° C. | Clear and rigid |
| 11 | CAP 95% | FZ91 5% | | | | 210° C. | 220-230° C. | Clear and rigid |

The blends in Table 1 were produced with a melt mixing process at the indicated temperature.

The films made with blends 5-11 in Table 1 were clear and transparent, as well as glossy. The rigidity of the film increased with the increasing CAP content.

The films made with blends 1-8 were particularly suitable for blown film extrusion process at laboratory or pilot scale.

The films made with blends 7-11 were particularly suitable for cast film extrusion process with laboratory or pilot scale.

However, none of the blends in Table 1 were suitable for industrial production at high outputs and process efficiency. The films made with blends in Table 1 had high friction and this property made them unqualified for industrial scale processing.

With blown film extrusion process at over 20 kg/hour production, the bubble was unstable, and the film rolls were uneven due to the high friction levels and tackiness. Similar problems were encountered with cast film extrusion process at over 50 kg/hour production, as the film could not be rolled evenly due to the high friction levels and tackiness.

Example 2

Cellulose-Based Compositions and Films With Additives

TABLE 2

Blends

| | | | | Additive | Additive | Compounding | Film extrusion | Film |
|---|---|---|---|---|---|---|---|---|
| Blend | Cellulose-based polymer | Second polymer | Third polymer | 1 | 2 | temperature | temperature | property |
| 7 | CAP 72.5% | FZ91 27.5% | | | | 210° C. | 210-215° C. | Clear film, High friction |
| 12 | CAP 72.5% | FZ91 25.5% | | S724 1% | S723 1% | 210° C. | 210-220° C. | Clear film, Medium friction |
| 13 | CAP 72.5% | FZ91 22.5% | | S724 3% | S723 2% | 210° C. | 210-215° C. | Clear film, Medium friction |
| 14 | CAP 72.5% | FZ91 26.5% | | S724 1% | | 210° C. | 210-220° C. | Clear film, Medium friction |
| 15 | CAP 72.5% | FZ91 24.5% | | S724 3% | | 210° C. | 210-215° C. | Clear film, Low friction |
| 16 | CAP 72.5% | FZ91 25.5% | | S547 2% | | 210° C. | 210-220° C. | |
| 17 | CAP 72.5% | FZ91 23.5% | | S547 4% | | 210° C. | 210-220° C. | |
| 18 | CAP 72.5% | FZ91 23.5% | | IM100 4% | | 210° C. | 210-215° C. | Clear film, High friction |
| 19 | CAP 72.5% | FZ91 21.5% | | IM100 6% | | 210° C. | 210-220° C. | Clear film, High friction |
| 20 | CAP 72.5% | FZ91 24.5% | | S511 3% | | 210° C. | 210-220° C. | Clear film, High friction |
| 21 | CAP 72.5% | FZ91 24.5% | | S547 2% | Incromold S 1% | 210° C. | | |
| 22 | CAP 72.5% | FZ91 24.5% | | S547 2% | Incroslip SL 1% | 210° C. | | |
| 23 | CAP 66.5% | FZ91 28.5% | | Incromax PS 5% | | 210° C. | 210-220° C. | Cloudy film |
| 24 | CAP 66.5% | FZ91 28.5% | | Silica | | 210° C. | 210-220° C. | Cloudy film |

The blends in Table 2 were produced with a melt mixing process at the indicated temperature. The films made with the blends in Table 2 were produced with a cast film extrusion line at the indicated temperature.

When friction is defined as High, this means the film cannot be produced efficiently as the static friction is over 1.8 and dynamic friction is over 0.6 which were too high for film production. When friction is defined as Medium, this means the film was processable to certain applications as the static friction is between 0.6-1.8 and dynamic friction is 0.3-0.6. When friction is defined as Low, this means the film was easy to process to various applications as the static friction is under 0.6 and dynamic friction is under 0.3.

Different additives, antifriction additives, slip additives and antiblock additives were tested with the cellulose-based film production. Many of the additives failed to improve the friction properties of the blend. Also, many of the additives reduce the transparency of the film to an unacceptable level. Some of the additives improve the friction level without affecting the transparency.

Industrial production of a cellulose-based film:

To a blown film extrusion process of three extruders was fed in the inmost layer and outmost layer a pre-compounded blend 6. To this was co-fed 1-5 wt. % of S724. In the middle layer was fed a pre-compounded blend 6. The film was produced with an output of 200-400 kg/hour. Thus, the processability at industrial scale was very good. The resulting film was transparent and clear and easy to process.

Example 3

Cellulose-Based Blends and Films With Heat-Sealing Polymers (Third Polymer)

TABLE 3

| | | | | | | | Film | |
|---|---|---|---|---|---|---|---|---|
| Blend | Cellulose-based polymer | Second polymer | Third polymer | Additive 1 | Additive 2 | Compounding temperature | extrusion temperature | Film property |
| 25 | CAP 56% | FZ91 24% | 4060D 20% | | | 220-230° C. | 210-230° C. | Opaque and rigid |
| 26 | CAP 63% | FZ91 27% | Biomelt 2K 10% | | | 220-230° C. | 210-230° C. | Clear and rigid |
| 27 | CAP 56% | FZ91 24% | FD92PM 20% | | | 220-230° C. | 210-230° C. | Clear and elastic |
| 28 | CAP 56% | FZ91 24% | FZ91 20% | | | 220-230° C. | 210-230° C. | Clear and elastic |

The blends in Table 3 were produced with melt mixing process at the indicated temperature. The films made with the blends in Table 3 were produced with a cast film extrusion line at the indicated temperature.

Different heat-sealing polymers were added to the cellulose-based blends to improve the heat-sealing properties.

The melt flow rate (MFR) of the heat sealing polymers is typically between 4-6 g/10 min (190° C.; 2.16 kg). For example, FD92PM the MFR is 4 g/10 min (190° C.; 2.16 kg) and FZ91PM the MFR is 5 g/10 min (190° C.; 2.16 kg).

Industrial production of a cellulose-based film with heat-sealing property: Film structure A-B-A To a blown film extrusion process of three extruders was fed in the inmost layer and outmost layer a pre-compounded blend 6. To this was co-fed 1-5% of slip agent. In the middle layer was fed a pre-compounded blend 6 and co-fed 10-30% of sealing polymer . The film was produced with an output of 200-400 kg/hour. Thus, the processability at industrial scale was very good. The resulting film was transparent and clear and easy to process.

The resulting film has very good heat-sealing properties for thin hot cut seals of bags and sachets as shown in Table 4. The film can be produced with 20-150 μm thickness.

TABLE 4

| | Strength tests of seal | | | |
|---|---|---|---|---|
| Sample | Strength at yield (N/mm) | Strain at yield (%) | Strength at break (N/mm) | Stress at break (%) |
| No sealing layer | 1.15 ± 0.08 | 2.8 ± 1.9 | 1.15 ± 0.08 | 3.0 ± 1.9 |
| Film structure A-B-A | 0.923 ± 0.07 | 16 ± 6.4 | 0.915 ± 0.07 | 16 ± 6.4 |
| Film structure A-B-A | 0.986 ± 0.08 | 15 ± 6.7 | 0.985 ± 0.08 | 15 ± 6.7 |
| Film structure A-B-A | 0.864 ± 0.34 | 7.0 ± 2.5 | 0.866 ± 0.34 | 7.1 ± 2.5 |

The films of structure A-B-A have excellent puncture resistance as shown in Table 5.

TABLE 5

| | Puncture resistance | |
|---|---|---|
| Sample | Puncture resistance (mJ) | Force (N) |
| Film structure A-B-A 40 μm thickness | 4.17 ± 0.31 | 4.52 ± 0.20 |

Industrial production of a cellulose-based film with heat-sealing property: Film structure A-B To a blown film extrusion process of three extruders was fed in the outmost layer a pre-compounded blend 6. To this was co-fed 1-5 wt. % of slip agent. In the middle layer was fed a pre-compounded blend 6. In the inmost layer was fed a pre-compounded blend 6 and co-fed 10-30 wt. % of sealing polymer with 1-5 wt. % of slip agent. The film was produced with an output of 200-400 kg/hour. Thus, the processability at industrial scale was very good. The resulting film was transparent and clear and easy to process. The resulting film has very good heat-sealing properties for flowpack sealing with wide seals and as a laminating film for carboard and paper. The film can be produced with 20-150 μm thickness with blown film extrusion process.

The film structures A-B and A-B-A can also be produced with cast film extrusion process to produce thicker films, such as 100-1000 μm.

Example 4

Cellulose-Based Films With Coatings

Coatings, such as dispersion coatings, adhesive coatings, sol-gel coatings, heat-resistance coatings, barrier coatings or mattifying coatings and so on can be used for achieving desired properties for the films. For sustainability and recyclability, it is of high importance that the coating layer is thin and contains only organic or inorganic components which do not prevent the further recycling processes. Various coatings were tested. The films can be pre-treated with plasma or corona treatments prior to the coating layer is applied. Film made from Blend 6 was coated with heat-sealing coatings according to Table 6.

TABLE 6

| Film | Coating |
| --- | --- |
| Blend 6 | Carbobond 1995 |
| Blend 6 | Carbobond 3005 |
| Blend 6 | Hycar 26084 |
| Blend 6 | Hycar 26288 |
| Blend 6 | Hycar 26349 |
| Blend 6 | Hycar 26548 |
| Blend 6 | ACTEseal HSC-426-WK |
| Blend 6 | ACTEseal HM-194-AFP |

Film made from Blend 6 was coated with sol-gel coatings to obtain good barrier properties Film made from Blend 6 was coated with barrier coatings for high water vapor barrier.

Film made from Blend 6 was coated with barrier coating for high chemical resistance.

Film made from Blend 6 was coated with heat resistant coating for better heat resistance.

Film made from Blend 6 was coated with mattifying coating to obtain a matte effect on the film.

Example 5

Production of Recycled Cellulose-Based Film

Mixed film waste containing blends 6 and 8 with additives was fed into a shredder, then melted and further extruded into a strand and pelletized. The granulate obtained was clear and transparent. This recycled granulate was made into a new film product with a cast film extrusion line. The film obtained was clear and transparent and films with a thickness from 20 μm to 300 μm were successfully prepared. No holes were detected in the recycled films indicating good recyclability and extruding properties for the recycled blends. The recycled film had excellent puncture resistance as shown in Table 7.

TABLE 7

| Puncture resistance. | | |
| --- | --- | --- |
| Sample Film 100% mechanically recycled content | Puncture strength (mJ) | Force (N) |
| 20 μm | 0.85 ± 0.18 | 0.98 ± 0.15 |
| 50 μm | 1.99 ± 0.35 | 2.13 ± 0.26 |
| 70 μm | 3.89 ± 0.26 | 3.96 ± 0.20 |
| 250 μm | 13.0 ± 1.12 | 14.5 ± 0.67 |

The recycled blend can be mixed with virgin cellulose-based blend. The fraction of mechanically recycled content can vary for example from 5 wt. % to 100 wt. % of the cellulose-based film.

Example 6

NIR (Near Infrared Spectroscopy) Separation of the Cellulose-Based Film

Film made with blend 6 with additives was thermoformed into clamshell packaging. These packaging items were analyzed for their NIR spectrum for plastic waste sorting. The samples showed a clearly identifiable spectral curve and could be identified and sorted in a plastics waste sorting system.

Example 7

Cellulose-Based Film With Chemically Recycled Content

A cellulose ester polymer or a polyester polymer suitable for co-extruded multi-layered cellulose-based can contain chemically recycled content.

The ester moieties in the cellulose-based polymers, such as CAP and CAB, can be partly or entirely made with chemically recycled feedstocks.

Also, the other polymers used in the blends such as FD92PM or FZ91 can be partly or entirely made with chemically recycled molecules. The fraction of chemically recycled content can vary for example from 10 wt. % to 80 wt. % of the cellulose-based film.

Example 8

Production of a Resealable Bag

A zipper for resealing a packaging bag was produced with a zipper extruder or a zipper profile extruder with blends 6, 7, 8, 9, 10, or 11. The zipper was successfully sealed to a bag made with a cellulose-based film with heat-sealing property with film structure A-B-A or A-B to make a resealable bag including a zipper.

The zipper had good resealing properties, mechanical properties, and modulus. The zipper was well suited for the resealing application.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined to form a further embodiment. A product, a system, a method, or a use, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to "an" item refers to one or more of those items. The term "comprising" is used in this specification to mean including the feature(s) or act(s) followed thereafter, without excluding the presence of one or more additional features or acts.

The invention claimed is:

1. A packaging material comprising a co-extruded multi-layered cellulose-based film, comprising:

a first film layer A comprising at least one first cellulose-based polymer and at least one second polymer, at least one sealing layer B being an outer layer and/or a middle layer of said film, wherein the sealing layer B comprises a first cellulose-based polymer being cellulose acetate propionate (CAP) and/or cellulose acetate butyrate (CAB), and at least one second polymer co-extruded in the sealing layer B and the second polymer co-extruded in the sealing layer B is selected from a group consisting of polybutylene succinate (PBS), polypropylene succinate (PPS), polybutylene succinate adipate (PBSA), polybutylene adipate terephthalate (PBAT), polycaprolactone (PCL), polybutylene adipate (PBA), polyhydroxyalkanoate (PHA), polyhydroxybutyrate (PHB), polyethylene furanoate (PEF), polybutylene terephthalate (PBT), polybutylene succinate terephthalate (PBST), and any polyester containing sebacic and/or azelaic acid and/or dodecanedioic acid as dicarboxylic acid alone or in combination with terephthalic acid, and any combination of these, and that the second polymer co-extruded in the sealing layer B is fed as 5 to 40 wt. % of a total weight of the sealing layer B, and a total amount of said first and said second polymer is at least 80 wt. % based on the total weight of said sealing layer B, one outer layer of the co-extruded multi-layered film comprises at least one slip additive in an amount of 1 to 5 wt. % based on the total weight of the one outer layer, said film is produced by a film extrusion process; and the packaging material is clear, transparent, and glossy.

2. The co-extruded multi-layered cellulose-based film according to claim 1, wherein said film has a cellulose content of at least 20 wt. %, or 30 to 60 wt. %, or 35 to 55 wt. %, or 40 to 45 wt. % based on a total weight of the film.

3. The co-extruded multi-layered cellulose-based film according to claim 2, wherein the film contains 5 to 80 wt. %, or 20 to 70 wt. %, or 30 to 60 wt. %, or 40 to 50 wt. %, or 5 to 40 wt. % chemically recycled content based on the total weight of the film.

4. The co-extruded multi-layered cellulose-based film according to claim 2, wherein said film contains 5 to 100 wt. % mechanically recycled content based on the total weight of the film.

5. The co-extruded multi-layered cellulose-based film according to claim 2, wherein the film comprises a film layer structure selected from the group consisting of A-B, A-B-A, A-B-C, A-C-B and A-A-B.

6. The co-extruded multi-layered cellulose-based film according to claim 5, wherein the sealing layer B comprises a first cellulose-based polymer selected from cellulose esters with an ester side chain length between C2 and C16, wherein the side chains may be branched or unbranched and may include mixtures of several ester groups, and wherein a degree of substitution of the cellulose-based polymer may be between 0.5 and 3.

7. The co-extruded multi-layered cellulose-based film according to claim 5, wherein the sealing layer B comprises at least one polymer co-extruded in the sealing layer B, wherein the co-extruded polymer is an aliphatic and/or aliphatic-aromatic polyester or is made by ring-opening of a lactone.

8. The co-extruded multi-layered cellulose-based film according to claim 1, wherein a process temperature of the film extrusion process is in the range of 200 to 240° C., or in the range of 210 to 230° C.

9. The co-extruded multi-layered cellulose-based film according to claim 1, wherein said film is produced by the film extrusion process with an output of 200-500 kg/h.

10. The co-extruded multi-layered cellulose-based film according to claim 1, wherein the film extrusion process is a blown film extrusion process or a cast film extrusion process.

11. The co-extruded multi-layered cellulose-based film according to claim 1, wherein said film comprises chemically recycled content.

12. The co-extruded multi-layered cellulose-based film according to claim 11, wherein the chemically recycled content is introduced within the cellulose-based polymer.

13. The co-extruded multi-layered cellulose-based film according to claim 1, wherein said film comprises mechanically recycled content.

14. The co-extruded multi-layered cellulose-based film according to claim 1, wherein the film contains both mechanically and chemically recycled content.

15. The co-extruded multi-layered cellulose-based film according to claim 1, wherein the film comprises the at least one sealing layer B, which is at least one of a middle layer and/or an outer layer of said co-extruded multi-layered film, and wherein said sealing layer B is introduced during the film extrusion process.

16. The co-extruded multi-layered cellulose-based film according to claim 1, wherein the sealing layer B comprises at least one polymer with heat- sealing property.

17. The co-extruded multi-layered cellulose-based film according to claim 1, wherein the sealing layer B comprises at least one polymer with a heat-sealing property, wherein the melting point of the polymer with a heat-sealing property is between 50°° C. and 210° C., or between 60° C. and 200° C., or between 70° C. and 190° C., or between 80° C. and 180° C.

18. The co-extruded multi-layered cellulose-based film according to claim 1, wherein the sealing layer B comprises at least one polymer with a heat-sealing property, wherein a MFR of the polymer with a heat-sealing property is between 1 g/10 min and 20 g/10 min (190° C.; 2.16 kg), or between 2 g/10 min and 15 g/10 min (190° C.; 2.16 kg), or between 3 g/10 min and 10 g/10 min (190° C.; 2.16 kg), or between 4 g/10 min and 6 g/10 min (190° C.; 2.16 kg).

* * * * *